May 31, 1955 F. H. MUELLER ET AL 2,709,606
PIPE COUPLING HAVING PERFORATED SOCKET FOR SOLDER
Original Filed Jan. 14, 1949
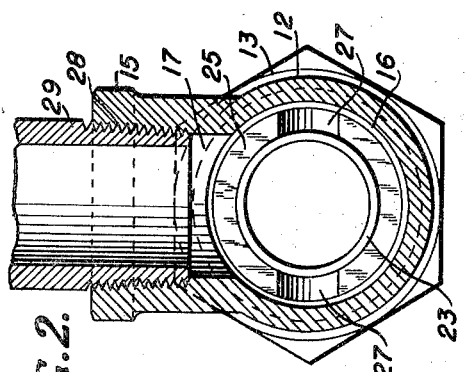
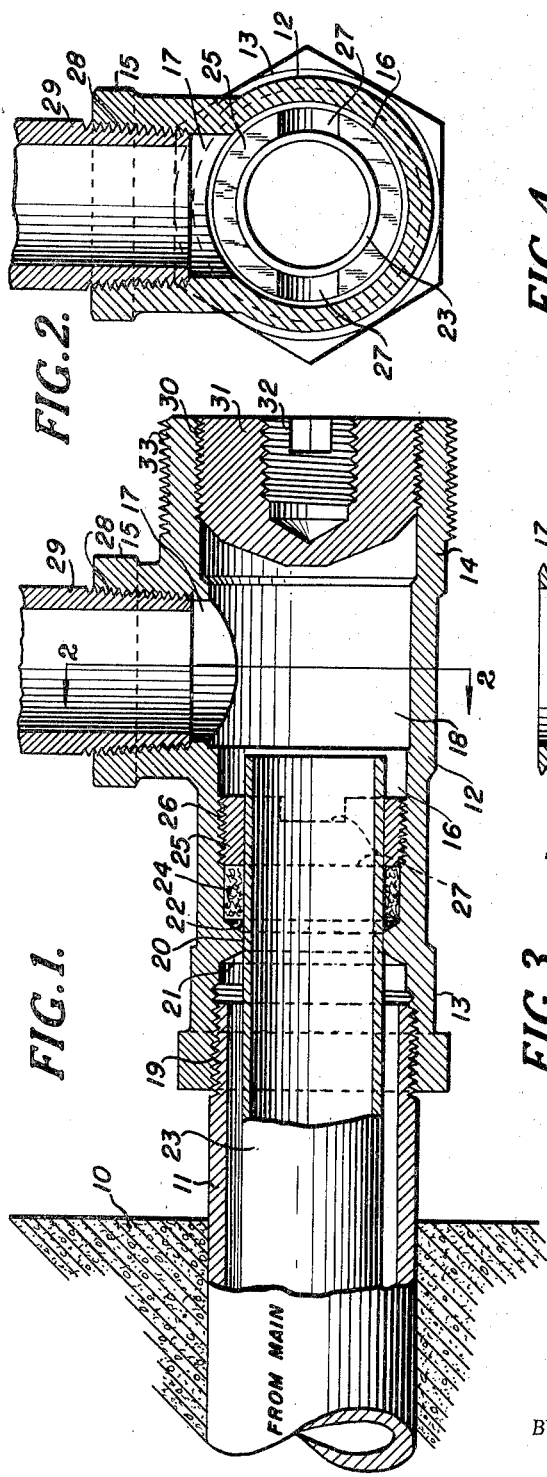
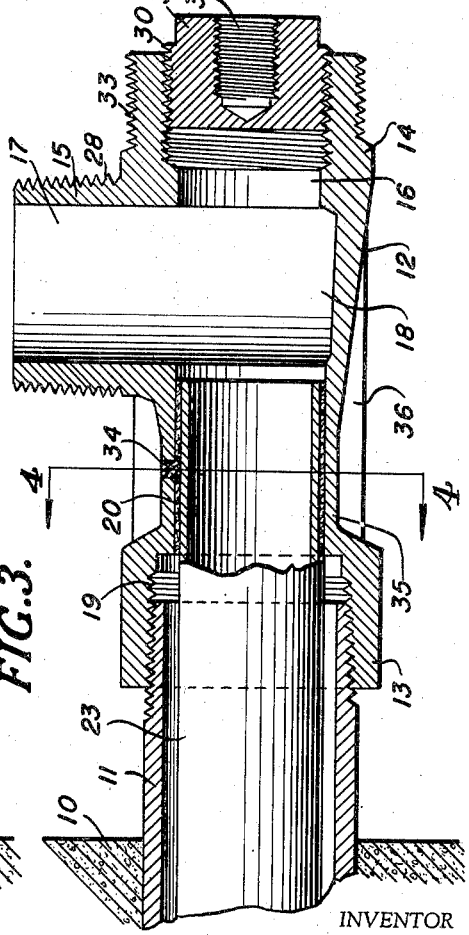
INVENTOR
FRANK H. MUELLER &
WALTER J. BOWAN
BY Cushman, Darby & Cushman
ATTORNEY United States Patent Office 2,709,606
Patented May 31, 1955

2,709,606

PIPE COUPLING HAVING PERFORATED SOCKET FOR SOLDER

Frank H. Mueller and Walter J. Bowan, Decatur, Ill., assignors to Mueller Co., Decatur, Ill., a corporation of Illinois Original application January 14, 1949, Serial No. 70,886, now Patent No. 2,641,491, dated June 9, 1953. Divided and this application October 7, 1952, Serial No. 313,514

2 Claims. (Cl. 285—118)

This invention relates to pipe fittings, particularly to T's adapted for use with replacement service tubes enclosed by and extending from existing, discontinued building service pipes. This application is a division of the copending application of Frank H. Mueller et al., Serial No. 70,886, filed January 14, 1949, now Patent No. 2,641,491 issued June 9, 1953.

In older fluid distribution systems, the service pipes from the underground mains to consumer buildings are commonly made of steel or other ferrous material. Soil conditions inevitably cause progressive deterioration of the service pipes by corrosion, resulting in leakage, and eventually necessitating replacement of the service pipes. A simple and economical replacement method has been widely practiced, employing a hard, thin-walled copper tube positioned within the discontinued service pipe, connected at one end to the service main and inside the building to the existing piping. To prevent leakage of soil water, gas, air and the like into the interior of the building, the annular space between the discontinued service pipe and the replacement service tube is commonly sealed off by packing with asphalt impregnated material and wrapping with similarly impregnated cloth. This replacement method has numerous obvious advantages, requiring excavation at the service main only, and utilizing the discontinued service pipe to guide the replacement copper tube during installation, and to protect the replacement tube thereafter from mechanical injury and from corrosion.

The walls of replacement service tubes ordinarily being too thin to permit threading, it is necessary to provide at the building end a fitting which may be otherwise affixed thereto in a fluid-tight manner. It is further desirable that such replacement fitting should make a fluid-tight seal with the discontinued service pipe also, to obviate the packing and wrapping formerly employed.

It is an object, therefore, of the present invention to provide a replacement T readily attached to a discontinued service pipe, adapted for sealing engagement with a smooth-walled replacement service tube enclosed by and extending from the service pipe.

It is a further object of this invention to provide a replacement T of simplified, unitary construction, expeditiously installed with a minimum of equipment.

A further object is to provide a replacement T readily connected to existing building piping with minimum disturbance thereof.

A still further object is to provide a replacement T into which seal-adjusting tools and service line stoppers may be inserted without the interruption of service in the main and without disconnecting the T. Other objects will be in part obvious, and in part pointed out hereinafter.

The invention and the novel features thereof may best be made clear from the following description and the accompanying drawings, in which:

Figure 1 is a longitudinal section through a preferred embodiment of the replacement T of the present invention, installed in operative relationship with a discontinued service pipe and a replacement service tube;

Figure 2 is a section taken on the line 2—2 of Figure 1;

Figure 3 is a longitudinal section through a further embodiment of the replacement T, adapted for forming a soldered joint with the replacement tube, and Figure 4 is a section taken on the line 4—4 of Figure 3.

Referring to the drawings, in Figure 1 is seen the basement or building wall 10, and the iron or steel service pipe 11 extending therethrough to the inside of the wall. The other end of the service pipe 11 extends, it will be understood, to a service main (not shown) under an adjacent street, or elsewhere located outside the wall 10. Threadably engaged to the end of pipe 11 inside wall 10 is a preferred embodiment of the replacement T of this invention, comprising a body 12, which includes the opposed extensions 13 and 14 and the lateral extension 15. The inner walls of extensions 13 and 14 define the longitudinal bore 16, and the inner wall of lateral extension 15 defines the lateral bore 17, communicating with the central chamber 18, constituting an enlarged portion of longitudinal bore 16. The end of longitudinal bore 16 within the extension 13 comprises the screw thread 19, in engagement with the externally threaded end of service pipe 11, whereby the replacement T is positioned and supported. The screw thread 19 is preferably a tapered iron pipe thread, whereby a fluid pressure-tight joint may be made with the service pipe 11 merely by threading the replacement T thereonto.

Extending inwardly from the wall of bore 16 adjacent screw thread 19 is the annular internal flange 20, comprising the outside wall 21 and the inside wall 22, which may be perpendicular to the wall of bore 16, but is preferably inclined with respect thereto, as shown. The internal diameter of flange 20 is slightly larger than the outside diameter of the smooth-walled copper replacement tube 23 enclosed thereby, permitting easy passage of the tube 23 therethrough during insertion into the pipe 11. The packing ring 24 is provided inside bore 16, abutting inside wall 22 of the flange 20, the abutting end of said packing ring being shaped to conform generally to the surface of inside wall 22, and the gland nut 25 is provided in abutting relationship with packing ring 24. Gland nut 25 is threadably engaged to the wall of bore 16 by means of the screw thread 26, whereby the gland nut may be rotated to compress packing ring 24 against the inside wall 22 of flange 20, to make a fluid-tight joint or seal between replacement tube 23 and the body 12 of the replacement T. Gland nut 25 is provided, at the inside end thereof, with suitable tool-engaging means, such as the slots 27. Gland nut 25 and packing ring 24, in relaxed, uncompressed condition, are of substantially the same inside diameter as flange 20, permitting, when loosely engaged, easy passage of the replacement tube 23 therethrough.

The lateral extension 15 of body 12 is provided with means, such as the screw thread 28 in lateral bore 17, for connection to the building piping, illustratively the iron or steel riser pipe 29. Obviously, suitable means may be provided for connection to a copper tube riser, with either a flanged or soldered joint.

In extension 14 of body 10, the screw thread 30 is provided in bore 16, adapted to receive the externally threaded plug 31, which comprises suitable tool-engaging means such as the internally threaded socket 32. The screw thread 33 is provided externally of extension 14, for reasons presently apparent.

The replacement T is installed in the following manner. The original elbow or other service fitting is unscrewed from service pipe 11 and the riser pipe 29, and discarded. The replacement T of this invention, with the packing ring 24 and the gland nut 25 in place therein but only loosely retained, is then screwed onto the pipe 11 by means of screw thread 19, making a fluid-tight joint therewith if the thread 19 is a tapered iron pipe thread, as is preferred. The replacement T is thereby supported, and the parts thereof adapted to make a fluid-tight joint with the replacement tube properly aligned and positioned. With plug 31 removed from the T, the thin-walled copper replacement tube 23 may be inserted through the T into service pipe 11, and pushed therethrough to the service main outside the building.

The replacement tube is then withdrawn slightly and with proper measurement severed so that on being pushed back the end of the tube extends from the discontinued service pipe 11 substantially to the central chamber 18, as shown. When the replacement tube has been thus re-inserted into operative position, the slots 27 of gland nut 25 may be engaged by a suitable tool, not shown, inserted into bore 16 through the extension 14, and the gland nut rotated and tightened to compress packing ring 24 against inside wall 22 of the flange 20, expanding the packing ring to effect a fluid-tight joint between the replacement service tube and the T body. The fluid-tight joint with the replacement tube, it will be readily seen, is thereby made entirely independently of the discontinued service pipe 11, and is formed entirely by smooth, new parts undamaged by corrosion or otherwise. The gland nut engaging tool may then be withdrawn, and plug 31 threaded into screw thread 30, and with the connection of riser pipe 29 to screw thread 30, the replacement job inside the building is complete. A small excavation may then be made at the main, the discontinued service pipe 11 disconnected therefrom and the replacement service tube connected thereto, and service resumed.

Without the interruption of service, by means of screw thread 33, suitable means may be attached to the extension 14 of the T, the plug 31 removed, and the joint formed by packing ring 24 and gland nut 25 tightened, or, when necessary, replaced. This may be done by the attachment of a control valve and drilling machine, in the manner well known in the art. Such a device and method are disclosed in U. S. Patent 1,996,345, issued April 2, 1935, to Frank H. Mueller. Further, as will be understood, by means of such devices a stopper may be inserted into and expanded in the replacement tube 23, thereby permitting disassembly of the piping within the building without interrupting service in the main. When the fluid in the system is gas, and the pressure very low, the above-mentioned operations may be performed without serious danger by merely removing plug 31, and allowing the gas to flow while the operation is being performed.

A modification of the replacement T is shown in Figure 3, wherein the T is adapted to make a soldered joint with the replacement tube, in place of the pressure joint of the modification previously described. In this embodiment, the internal flange 20 is desirably widened, to present a considerable surface area to the enclosed replacement tube 23, and the wall of body 12 outside the internal flange is provided with the passage 34 therethrough, whereby solder may be introduced between the internal flange and replacement tube. The inner wall of the flange may be suitably grooved, if desired, to facilitate the distribution of the solder thereabout. To facilitate heating of the T body for the soldering operation, the body 12 outside the flange is desirably shaped into the section 35 of reduced thickness, which is strengthened by the ribs 36.

The installation of the replacement T shown in Figure 3 is accomplished in the same manner as that of the T previously described, with the exception, of course, that the joint with the replacement tube is made by soldering, rather than by tightening a gland nut against a packing ring. The screw thread 33 on extension 14 may be employed, as before, to insert a stopper into the replacement tube, making possible disassembly of the building piping without interrupting service in the main.

The modified T, in common with the embodiment first described, combines in a single fitting a complete replacement of an old service installation, involving but a single fluid-tight joint, that between the replacement T and the replacement tube. The replacement T is merely threaded onto the discontinued service pipe to rigidly support the T, although this connection may also be made fluid-tight, if desired, by the employment of a tapered thread, as previously described. Once installed, it will be seen, the replacement T of this invention may not be disconnected from the replacement tube without dismantling the entire riser line, an important safety feature.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative and not in a limiting sense.

We claim:

1. A replacement T for connection to a smooth walled tube concentrically enclosed by and extending from a discontinued service pipe, comprising: a one-piece body having a straight longitudinal bore therethrough and a lateral bore in communication with said longitudinal bore; a screw thread in said body at one end of said longitudinal bore for engagement with the service pipe; an annular internal flange projecting from said longitudinal bore adjacent said screw thread for enclosing the tube; means for introducing solder from the exterior of said body between said internal flange and said tube; an internal plug-engaging screw thread in said body at the other end of said longitudinal bore; and an external screw thread in said body at the plug-engaging end thereof substantially concentric with said internal screw thread and adapted for engaging fluid-tight tool-inserting mechanism.

2. A replacement fitting for connection to a smooth-walled tube concentrically enclosed by and extending from a discontinued service pipe, comprising: a body having spaced inlet and outlet portions and a bore portion providing communication therebetween, the bore of said bore portion being aligned with the inlet of said inlet portion for reception of the tube; a screw thread in said inlet for engagement with the pipe; means for introducing solder from the exterior of said body between the tube and the wall of said bore, the wall of said bore portion being of less thickness than those of said inlet and outlet portions to facilitate heating of said bore portion; and exterior strengthening ribs on said bore portion bridging said inlet and said outlet portions.

References Cited in the file of this patent

UNITED STATES PATENTS

| | | |
|---|---|---|
| 616,578 | Love | Dec. 27, 1898 |
| 1,200,851 | Kennedy | Oct. 10, 1916 |
| 1,289,575 | Tisne | Dec. 31, 1918 |
| 1,918,442 | Baash | July 18, 1933 |
| 1,931,666 | Lindquist | Oct. 24, 1933 |
| 1,978,547 | McWane | Oct. 30, 1934 |
| 1,996,345 | Mueller | Apr. 2, 1935 |
| 2,017,717 | Heeter | Oct. 15, 1935 |
| 2,071,842 | Kennedy | Feb. 23, 1937 |
| 2,179,045 | Lewis | Nov. 7, 1939 |
| 2,268,263 | Newell | Dec. 30, 1941 |
| 2,482,687 | Mueller | Sept. 20, 1949 |
| 2,546,348 | Schuman | Mar. 27, 1951 |

FOREIGN PATENTS

| | | |
|---|---|---|
| 276,215 | Great Britain | Aug. 25, 1927 |
| 571,935 | Great Britain | Sept. 14, 1945 |